Dec. 24, 1968 R. M. HULTBERG 3,418,579

SATELLITE COMMUNICATION SYNCHRONIZING SYSTEM

Filed Sept. 8, 1964 4 Sheets-Sheet 1

INVENTOR.
RICHARD M. HULTBERG
BY Percy P. Lantzy
ATTORNEY

Dec. 24, 1968 R. M. HULTBERG 3,418,579

SATELLITE COMMUNICATION SYNCHRONIZING SYSTEM

Filed Sept. 8, 1964 4 Sheets-Sheet 2

INVENTOR.
RICHARD M. HULTBERG
BY Percy P. Lantzy
ATTORNEY

SATELLITE COMMUNICATION SYNCHRONIZING SYSTEM

Filed Sept. 8, 1964 4 Sheets-Sheet 3

INVENTOR
RICHARD M. HULTBERG
BY Percy P. Lantzy
ATTORNEY

INVENTOR.
RICHARD M. HULTBERG
BY Percy P. Lantzy
ATTORNEY

3,418,579 SATELLITE COMMUNICATION SYNCHRONIZING SYSTEM

Richard M. Hultberg, Falls Church, Va., assignor, by mesne assignments, to Communications and Systems, Incorporated, a corporation of Nevada Filed Sept. 8, 1964, Ser. No. 394,776
20 Claims. (Cl. 325—52)

ABSTRACT OF THE DISCLOSURE

A satellite communication synchronizing system wherein a plurality of independent stations utilizes a common satellite repeater as in time division multiplex mode of operation. Synchronization is accomplished by selecting one station as a master station to transmit a master synchronization signal. The other stations generate station synchronization signals which are adjusted in time relative to received master synchronization signals. A closed loop system via the satellite is utilized for fine adjustment of each station's synchronizing signal to cause the station synchronizing burst to be transmitted near or about the beginning of the assigned or selected time slot so that the complete station transmission may be properly contained within its slot, a guard interval between slate permitting minor timing variations. Consult the specification for other details and features of the invention.

This invention relates to satellite communication systems and more particularly to a synchronizing system, and method of synchronizing enabling a plurality of independent stations to have time division multiplex intercommunication via a repeater carried by a satellite.

Now that satellites with solar or other powered repeaters have been proven capable of providing communication between distant stations, an object of this invention is to provide a synchronizing system and method of synchronizing enabling optimum use of the power and bandwidth of such a satellite-supported repeater on a time-sharing basis without any or at least a minimum of interference between stations using adjacent or other assigned time slots.

Another object is to provide a synchronizing system and method of synchronizing for the ground stations of a multichannel satellite communication system wherein the repeater of the satellite is kept relatively simple in design and consequently of exceptionally high reliability.

An important feature of this invention is that the synchronizing system and method are useful in conjunction with either the medium altitude satellite or the synchronous satellite which orbits in time relation with the rotation of the globe so that it remains in an approximately fixed relation to a given area of the globe.

Another feature of this invention is that any station may occupy any available time slot and any station may be selected to act as the master station with reference to which the other stations can quickly synchronize their transmissions.

Another feature of this invention is that the station equipment is able to tolerate small variations in burst position timing without losing system synchronism or bit synchronism within any particular time slot, and without causing mutual interference between stations.

The system herein described comprises a novel synchronization scheme whereby a plurality of independent stations may accomplish noninterfering multiple entry to a satellite repeater by sequentially transmitting bursts of information to arrive at the satellite repeater in a precisely prescribed time slot. The prescribed time slot may be assigned a priori or may be selected at random, depending upon system discipline. The above method of transmission is commonly referred to as time division multiplexing (TDM) and has been in common usage for some time. But, the novelty of the solution to the synchronizing problem is the key factor from which is derived the instant invention.

All of the operations relating to the interleaving of transmission bursts and the synchronizing of same are performed at the individual stations, and therefore, the satellite repeater may comprise basically a simple limiter-amplifier-frequency conversion repeater. This simplification in satellite repeater configuration correspondingly gives rise to increased reliability.

The above-mentioned and other features and objects of this invention will become more apparent by reference to the following description taken in conjunction with the accompanying drawings, in which.

Figure 1:
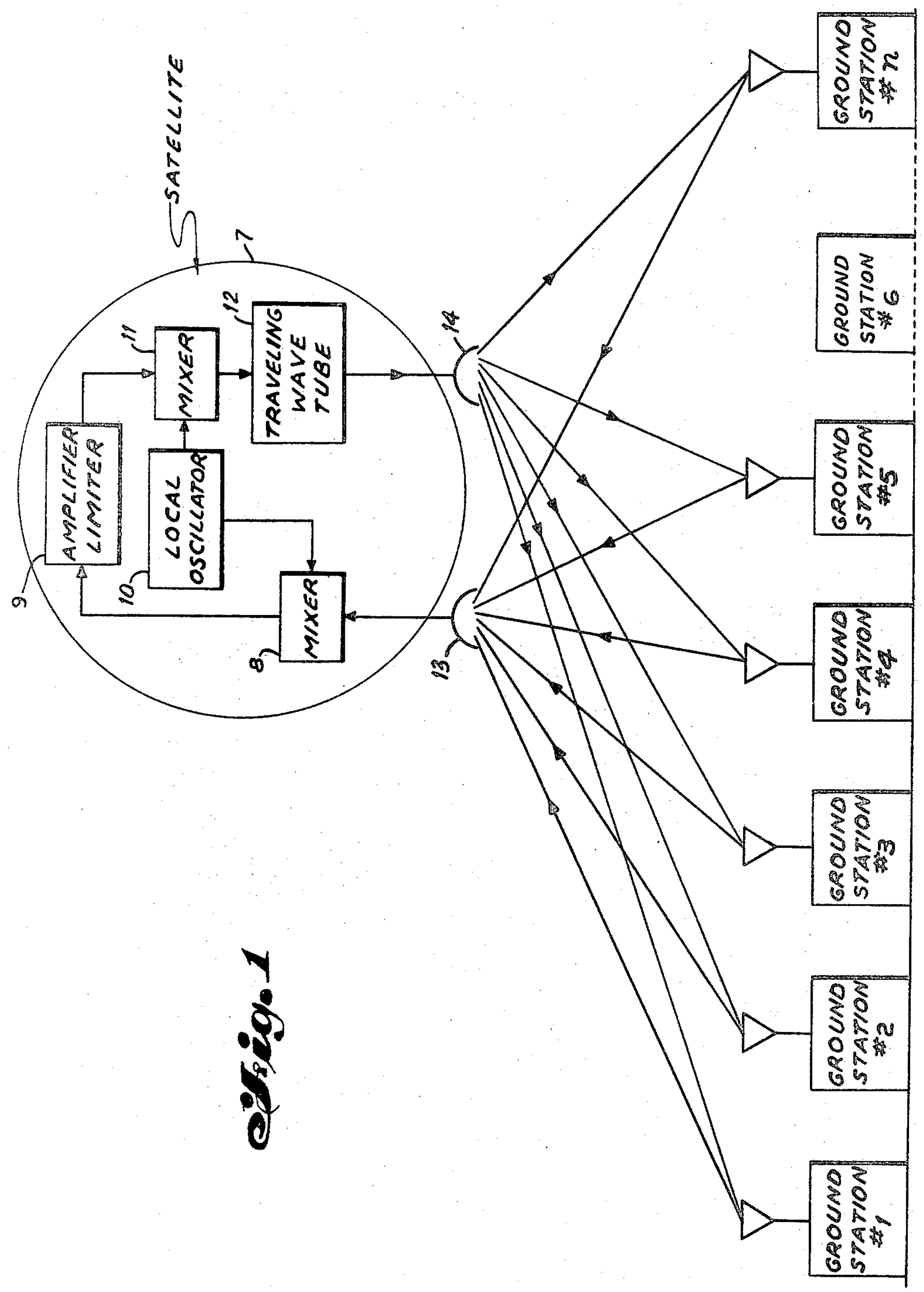
FIG. 1 is a block diagram of a typical satellite communication system in accordance with this invention.

A block diagram of a typical system consistent with the instant application is shown in FIG. 1 comprising a plurality of stations 1–*n* having time-division multiplexed intercommunication via satellite repeater 7. The satellite repeater 7 comprises the following components which are coupled to produce a repeater amplifier consistent with the presently known art: a receiver antenna 13, a receiver mixer 8, an amplifier limiter 9, a local oscillator 10, a transmitter mixer 11, a traveling wave tube 12, and a transmitter antenna 14. The receiver and transmitter antennae, 13 and 14 respectively, are shown as two separate units but one reasonably skilled in the art could combine them into one integrated unit. Each station 1–*n* transmits a short burst of information which is timed to arrive at the satellite repeater 7 in an assigned position in time. Thus, at the satellite receiver antenna 13 the series of such bursts, properly interleaved in time, appear as a single train of pulses to be amplified and transmitted.

Figures 2, 3:
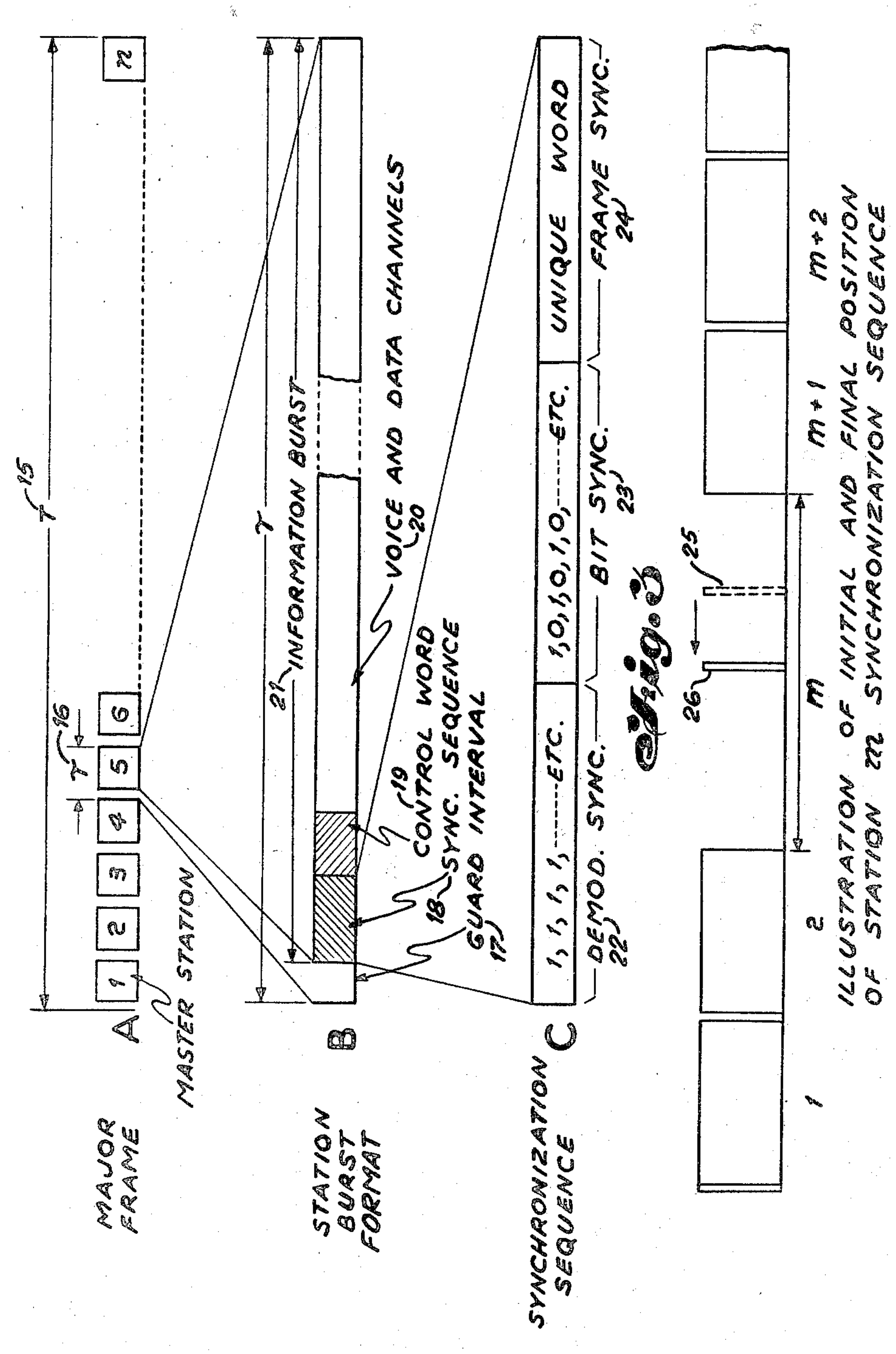
FIG. 2 is a diagram of the major frame format illustrating: A, the time-sharing of a plurality of stations; B, a typical station burst format adapted to fit within the assigned time slot of the major frame; and C, a typical synchronization sequence occupying a portion of a typical station burst format.
FIG. 3 is a diagram illustrating the initial and final positions of a station synchronization signal showing the manner of locating the assigned time slot and adjusting the timing of the synchronization sequence in relation thereto for access of the station burst format.

Referring to FIG. 2 section A it is observed that each station 1–*n* is assigned a particular time slot 16 within the major frame 15, one of these stations being designated the master station 1 and being assigned time slot number 1. The major frame is periodic in nature and is repeated ever T seconds where $$T = n\tau$$

and $\tau$=length of time slot in seconds
$n$=number of time slots.

FIGURE 2 section B shows a typical time slot format comprising a short guard interval 17 and an information burst 21 comprising a synchronization sequence 18, a control word 19, and voice and, or, data channels 20. The purpose of the guard interval 17 is to prevent adjacent channel interference (or overlapping). The synchronization sequence 18, as is detailed in FIGURE 2 section C comprises a demodulator synchronization word 22, a bit synchronization word 23, and a frame synchronization word 24, the latter identifying the particular time slot 16 in use. The master station 1 emits a unique frame synchronization word which is recognizable by all the other stations 2–*n* and with reference to which they all synchronize their transmissions.

The control word 19 is not pertinent to the explanation of the synchronization system disclosed herein and therefore it will not be discussed further. The purpose of the demodulator synchronization word 22 and the bit synchronization word 23 is to enable the demodulator 29 and the bit synchronizer 30, FIG. 4, to synchronize themselves with the incoming information. This resynchronization is performed every time a station burst is received since the system operates quasi-synchronously with respect to individual station bursts but synchronously with respect to the information within any one station burst. By quasi-synchronous it is meant that the burst positions will have a small timing variation consistent with the resolution of the error detecting means.

FIGURE 3 illustrates the initial and final positions, 25 and 26 respectively, of the synchronization sequence 18 transmitted by station *m* (any arbitrary station). It should be noted that during the synchronizing operation, no information is transmitted except for the synchronization sequence 18. After synchronization is achieved, as detected by the synchronization detector 40, FIG. 4, the rest of the station equipment will be enabled and normal operation will commence.

Figure 4:
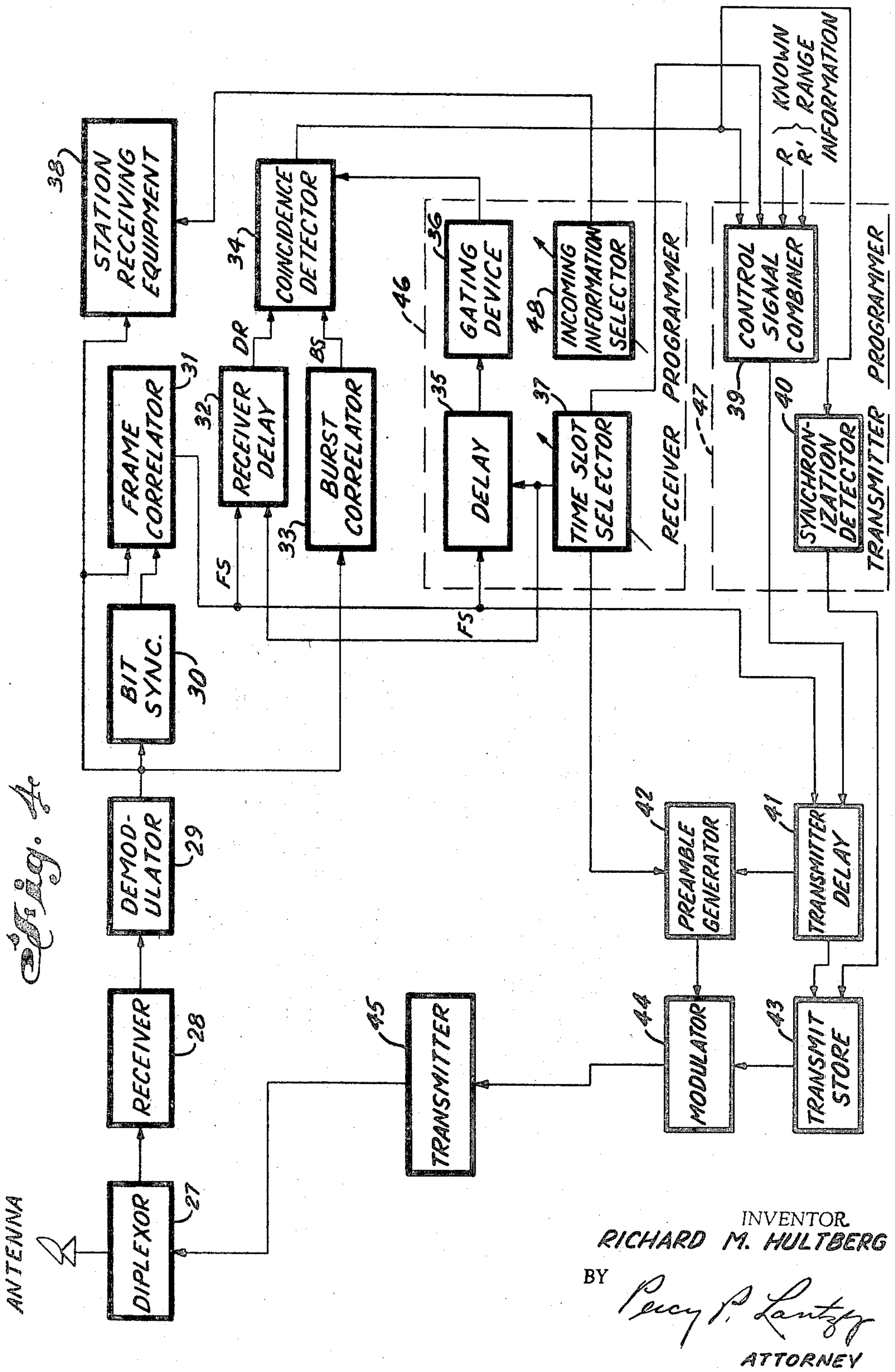
FIG. 4 is a block diagram of the station synchronizing equipment for transmitting and receiving synchronized signals via the satellite repeater.

FIG. 4 shows a block diagram of a typical station 1, 2, 3 . . . *n*, which performs basically the following functions:

(1) transmits a trial synchronization sequence 18 aimed for the center of the assigned time slot 16,
(2) observes the timing of the return signal from the satellite, and
(3) re-times the transmission of the synchronization sequence 18 very accurately so that it occurs at the start of its assigned time slot 16.

The function of each element comprising the typical station shown in FIG. 4 will become apparent in view of the following discussion.

Referring to FIG. 2, assume that station 1 is designated the master station and transmits a unique synchronization sequence which is identifiable by all other stations. Assume further that the station, the operation of which is presently being described, is assigned time slot *m* and wishes to begin transmission in synchronism with station 1 via said time slot. Initially, one operates the time slot selector 37 and selects time slot *m*. This sends delay in formation directly to the receiver delay 32 and to the transmitter delay 41 via the transmitter programmer 47. The receiver delay 32 is adjusted in accordance with the expression:

$$D_r=(m-1)\tau$$

and the transmitter delay 46 in accordance with the expression:

$$D_t=(m-\tfrac{1}{2})\tau$$

Known information regarding the satellite's range and range rate is also fed to the transmitter delay 41 via control signal combiner 39 further modifying its adjustment. It is attempted to adjust the transmitter delay 41 to a value that will permit the initial station synchronization sequence 25 (FIG. 3) to reach the satellite repeater as close to the center of its assigned time slot as possible. The reason for choosing this desired position for the initial transmission will be discussed subsequently.

Figure 5:
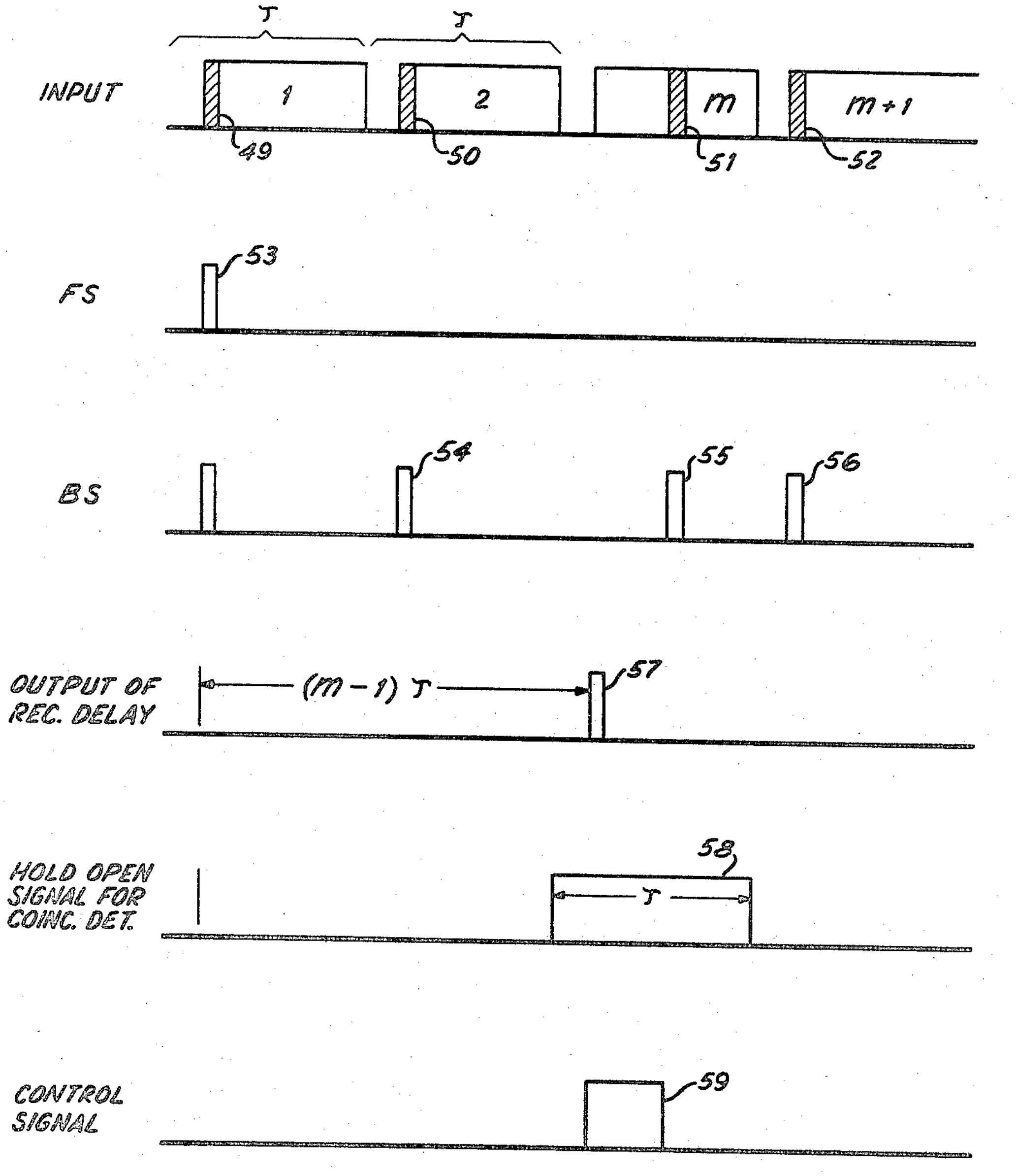
FIG. 5 is a timing diagram illustrating various signals appearing in the synchronizing system.

At the output of the frame correlator 31 of station *m* there will appear a pulse (pulse 53, FIG. 5) on the lead marked "FS" corresponding to the instant when the master station synchronization signal 49 is received.

Pulse 53 is applied to the receiver delay 32 and is delayed by the amount $(m-1)\tau$, producing a pulse 57 which is in the exact position in time that the station *m* synchronization pulse 51 is ultimately desired to be in. Therefore, pulse 57 which resulted from delayed pulse 53 is used as the reference pulse with respect to which the station will synchronize. Pulse 53 is also applied to the transmitter delay 41 in order to start it in operation and to the delay 35 within the receiver programmer 46, the function of which will be discussed below.

At the output of the station burst correlator 33 there will appear on the lead marked "BS" pulses 54, 55, and 56 (FIG. 5) corresponding to the instant when any of the *n* station synchronizing signals 50, 51 and 52, are received, where *n* is the total number of stations (or time slots) in the system. This series of pulses on the BS lead, along with pulse 57 from the receiver delay 32 are then applied to the coincidence detector 34 which is normally in the "off" condition. The coincidence detector 34 is turned "on" by pulse 58 which is generated by means of the delay 35 and the gating device 36 combination at the beginning of time slot *m* and is held "on" for the duration of said time slot. The coincidence detector 34 generates a control signal (pulse 59, FIG. 5) corresponding to the time difference (plus or minus) between the station *m* synchronization pulse 55 and the delayed master synchronization pulse 57. This control signal 59 is then applied to the control signal combiner 39 to further modify the adjustment of the transmitter delay 41 in such a direction as to cause the station synchronization burst to be transmitted closer to the beginning of the time slot. This in turn causes the control signal 59 to decrease. It is now evident that the disclosed invention operates as a closed loop control system and forces which tend to unsynchronize the system will automatically be compensated for so long as these forces are within the design range of the system.

At this point it should be noted that the synchronization procedure is performed only to synchronize the transmissions from any particular station within its assigned time slot. The incoming information selector 48, within the receiver programmer 46, in combination with the station receiving equipment 38, provides the capability for the receiving station to receive selected information from any time slot or combination of time slots independent of the time slot that the said receiving station itself occupies. Operation of the incoming information selector 48 sends signals to the station receiving equipment 38 denoting the time slot or slots that the desired information is being transmitted in. The receiving equipment 38 then performs the necessary functions required to remove the desired information from the data stream. The elements comprising the station receiving equipment 38 are well known in the prior art and are capable of being assembled to produce the desired results by anyone reasonably skilled in the art.

Proper operation of the subject synchronizing system depends upon the predictability of the satellite range prior to acquisition of said satellite by the station since the range information is utilized to vary the transmitter delay 41 which in turn varies the timing of the transmissions. At the present, this range prediction can be made with moderate precision from satellite orbital data computed many days in advance within ±50 microseconds of transmission time. For this reason and from other considerations a time slot length of 125 microseconds was chosen for the typical system described herein. Since as mentioned previously, the initial transmission 25 from a station is aimed for the center of its assigned time slot, one may guarantee this initial transmission reaching the satellite repeater within the assigned time slot even if there occurred the maximum initial error ±50 microseconds. This choice of time slot length prevents a station entering the system from interferring with stations that are in operation.

In a system with $n$ time slots (and therefore $n$ stations) where each time slot is 125 microseconds long the repetition rate of the transmission burst from any one station is $1/n_T$ burst per second. In a typical case where $n=100$, each station would transmit its 125 microsecond burst every 12.5 milliseconds. During the 12.5 millisecond interval information would be stored up in the transmit store 43 and then released in a burst during the assigned time slot. Thus, information is generated at one rate, stored up, transmitted at a much faster rate, and then restored to its original rate by the receiver on the other end of the link. The information that is transmitted in the burst may itself be in time division multiplexed form.

An adequate guard interval 17 is required between information bursts 21 of adjacent time slots 16 in order to prevent adjacent channel interference caused by slight errors in transmission timing. In the typical system with 100 time slots and a time slot length of 125 microseconds each station transmits its burst of information every 12.5 milliseconds. Since the synchronizing equipment is always operating and detecting small errors in synchronization, control signals 59 will be generated every 12.5 milliseconds. However, control signals 59 are utilized for correction purposes only at intervals equal to twice the path delay from the station to the satellite repeater. This is done so that the results of the previous timing correction may be examined before a further correction is made in the transmission timing. Contained in the known range information is a signal indicating twice the path delay from the station to the satellite which controls the control signal combiner 39, allowing it scontrol output to pass on to the transmitter delay 41 at said intervals equal to twice the said path delay. It can reasonably be expected that this periodic utilization of control signals 59 will limit the uncertainty in synchronization to less than one microsecond. Therefore, a one microsecond guard interval 17 is chosen. In order to realize high efficiency of utilization of the satellite, the length of time within the time slot 16 allocated for voice and data information is large in comparison to the sum of the lengths of time allocated to the guard interval 17, the synchronization sequence 18, and the control word 19. Therefore, a guard interval of one microsecond is acceptable since it is long enough to accommodate the expected uncertainty of synchronization and it is very small compared to the typical time slot length 16 of 125 microseconds.

In the preferred embodiment of this invention, the stations operate in a digital mode. All of the control information is in digital form and all of the operations are digital in nature and under the control of a local clock. This clock was not shown in FIG. 4 since it is not essential to the description of the synchronization system's operation.

While I have described above the principles of my invention in connection with specific apparatus and particular modifications thereof, it is recognized that many variations may be made without departing from the invention. It is to be understood, therefore, that this description is made only by way of example and not as a limitation on my invention and the scope thereof as set forth in the objects and the accompanying claims.

I claim:

1. In a satellite communication system having at least one satellite of known range carrying a radio repeater and a plurality of stations capable of multiplex communication between said stations via said satellite repeater; a synchronizing system enabling said stations to use said satellite repeater on an interleaved time division basis comprising:

first means at one of said stations transmitting a master synchronization signal which is received at each of the other stations via said repeater;

means at each of said other stations for receiving said master synchronization signal transmitted via said repeater;

second means at each of said other stations to transmit a station synchronization signal adjusted in time with respect to the received master synchronization signal and the known satellite range information for access to the assigned time slot of the respective station; and third means at each of said stations to compare its respective station synchronization signal, after said station synchronization signal has traversed the path from the station through the satellite and back to the said station, with the master synchronization signal to obtain a control signal and to apply said control signal to said second means to vary the timing of the synchronization signal produced thereby.

2. A system according to claim 1 wherein said second means includes:

means for generating a synchronization signal;

a delay means for determining the timing operation of said synchronization signal generating means;

means to produce time slot information denoting the assigned time slot for said station; and means to apply to said delay means said time slot information, said range information, and said control signal to control the amount of delay imposed on said synchronization signal.

3. A system according to claim 1 wherein said third means includes:

means to detect said master synchronization signal;

means to detect said station synchronization signal;

means to delay the detected master synchronization signal a fixed amount depending upon the time slot it is desired to synchronize on; and means to compare the timing of said delayed master synchronization signal and said station synchronization signal to obtain said control signal proportional to the time difference between the two said signals.

4. A system according to claim 2 wherein said third means includes:

means to detect said master synchronization signal;

means to detect said station synchronization signal;

means to delay the detected master synchronization signal a fixed amount depending upon the time slot it is desired to synchronize on; and means to compare the timing of said delayed master synchronization signal and said station synchronization signal to obtain said control signal proportional to the time difference between the two said signals.

5. In a satellite communication system having at least one satellite of known range carrying a radio repeater and a plurality of stations capable of multiplex communication between stations via said satellite repeater on a time division basis in which each station is assigned a time slot within a major frame, said major frame comprising a plurality of time slots, each time slot providing for a guard interval and a transmission burst, each burst including a synchronization signal and message information wherein said synchronization signal occurs in a predetermined location within said time slot; a method of synchronizing the transmission bursts of said stations comprising:

the steps of transmitting a master synchronization signal from one of said stations which is received at each of the other stations via said repeater;

receiving said master synchronization signal at each of said other stations;

transmitting from each of said other stations a station synchronization signal adjusted in time with respect to the received master synchronization signal and the range of said satellite for access to the assigned time slot of the respective station;

comparing at each station the timing of its respective station synchronization signal with said master synchronization signal, after said station synchronization signal has traversed the path from the station through the satellite and back to the station, with said master synchronization signal to obtain a control signal; and
utilizing said control signal to determine the timing of the transmission of said station synchronization signal for occurrence at its predetermined location within the stations assigned time slot.

6. In a system according to claim 5 wherein said method of transmitting a station synchronizing signal adjusted in time with respect to said master synchronizing signal and the range of said satellite includes:
decoding the time slot information;
combining the above decoded information, producing a delay control signal proportional to the desired delay; and
utilizing said delay control signal to determine the transmission timing of the station synchronizing signal.

7. In a system according to claim 5 wherein said method of comparing the timing of the station synchronizing signal with the master synchronizing signal to obtain a control signal includes:
detecting the master synchronizing signal;
detecting the station synchronizing signal;
delaying the detected master synchronizing signal so that it occupies the position in the time slot that the station synchronizing signal is desired to occupy; and
comparing the delayed master synchronizing signal with the station synchronizing signal and thereby produce said control signal proportional to the time difference between the two said signals.

8. In a system according to claim 6 wherein said method of utilizing said control signal to vary the timing of the transmission of said station synchronizing signal includes:
decoding said control signal;
combining said decoded control signal with said decoded time slot information and range information to modify said delay control signal; and
utilizing said modified delay control signal to determine the timing of the transmitted station synchronizing signal until said station synchronizing signal occurs at its predetermined location within the stations assigned time slot.

9. For use in a satellite communication system having at least one satellite carrying a radio repeater and a plurality of stations capable of multiplex communication between said stations via said satellite repeater and means to transmit a master synchronization signal which is received at each of the stations via said repeater; a system enabling said stations to use said satellite repeater on an interleaved time division basis comprising:
first means at one of said stations to transmit a station synchronization signal adjusted in time with respect to the received master synchronization signal for access to the assigned time slot of the respective station; and
means at said one of said stations for receiving said master synchronization signal, and
second means at said one station to compare the respective station synchronization signal, after said station synchronization signal has traversed the path from the station to the satellite and back to the said station, with the master synchronization signal to obtain a control signal and to apply said control signal to said first means to vary the timing of the synchronization signal produced thereby.

10. The invention according to claim 9 wherein said first means includes:
means for generating a synchronization signal;
a delay means for determining the timing operation of said synchronization signal generating means;
means to produce time slot information denoting the assigned time slot for said station; and
means to apply to said delay means said time slot information, and said control signal to control the amount of delay imposed on said synchronization signal.

11. The invention according to claim 10 wherein said second means includes:
means to detect said master synchronization signal;
means to detect said station synchronization signal;
means to delay the detected master synchronization signal a fixed amount depending upon the time slot it is desired to synchronize on; and
means to compare the timing of said delayed master synchronization signal and said station synchronization signal to obtain a control signal proportional to the time difference between the two said signals.

12. The invention according to claim 9 wherein said second means includes:
means to detect said master synchronization signal;
means to detect said station synchronization signal;
means to delay the detected master synchronization signal a fixed amount depending upon the time slot it is desired to synchronize on; and
means to compare the timing of said delayed master synchronization signal and said station synchronization signal to obtain a control signal proportional to the time difference between the two said signals.

13. The invention according to claim 9 wherein said first named means includes:
means for adjusting said station synchronization signal in time in accordance with satellite range information.

14. For use in a satellite communication system having at least one satellite carrying a radio repeater and a plurality of stations capable of multiplex communication between stations via said satellite repeater on a time division basis in which each station is assigned a time slot within a major frame, said major frame comprising a plurality of time slots, each time slot providing for a guard interval and a transmission burst, each burst including a synchronization signal and message information wherein said synchronization signal occurs in a predetermined location within said time slot and a master synchronization signal is transmitted from one of said stations which is received at each of the other stations via said repeater; a method of synchronizing the transmission bursts of said stations comprising the steps of:
receiving said master synchronization signal at each of said other stations;
transmitting from at least one of said other stations a station synchronization signal adjusted in time with respect to the received master synchronization signal for access to the assigned time slot of the respective station;
comparing at each station the timing of its respective station synchronization signal, after said station synchronization signal has traversed the path from the station to the satellite and back to the said station, with said master synchronization signal to obtain a control signal; and
utilizing said control signal to determine the timing of the transmission of said station synchronization signal for occurrence at its predetermined location within the stations assigned time slot.

15. The method according to claim 14 wherein said step of transmitting a station synchronizing signal adjusted in time with respect to said master synchronizing signal includes:
decoding the time slot information;
combining the above decoded information with said control signal, producing a delay control signal proportional to the desired delay; and
utilizing said delay control signal to determine the transmission timing of the station synchronizing signal.

16. The method according to claim 14 wherein said step of comparing the timing of the station synchronizing signal with the master synchronizing signal to obtain a control signal includes:
detecting the master synchronizing signal;

detecting the station synchronizing signal;

delaying the detected master synchronizing signal so that it occupies the position in the time slot that the station synchronizing signal is desired to occupy; and comparing the delayed master synchronizing signal with the station synchronizing signal and thereby produce said control signal proportional to the time difference between the two said signals.

17. In the method according to claim 14 wherein the step of utilizing said control signal to vary the timing of the transmission of said station synchronizing signal includes:

decoding said control signal;

combining said decoded control signal with said decoded time slot information to modify said delay control signal; and utilizing said modified delay control signal to determine the timing of the transmitted station synchronizing signal until said station synchronizing signal occurs at its predetermined location within the station's assigned time slot.

18. The method according to claim 14 wherein each said station synchronization signal includes, first, a demodulator synchronization word, second, a bit synchronization word and, third, a frame synchronization word, said demodulator synchronization word causing a demodulator at said one station to synchronize itself with incoming information, said bit synchronization word causing a bit synchronizer in said one station to synchronize with incoming information, said frame synchronization word being unique to the station transmitting same and identifying the particular time slot in use by a station;

whereby resynchronization by said synchronization words is performed every time a station burst is received and the system operates quasi-synchronously with respect to individual station bursts but synchronously with respect to the said message information within any one station burst.

19. A radio station for use in a satellite communication system of the time division multiplex type in which each station is assigned a time slot within a major frame, said major frame comprising a plurality of time slots, each time slot providing a guard interval and a transmission burst, each burst including a synchronization signal and message information wherein said synchronization signal occurs in a predetermined location within said time slot comprising:

means at said station to receive a master synchronization signal from said satellite, generator means at said station to generate a station synchronization signal adjusted in time with respect to the received master synchronization signal and range to the satellite for controlling access to an assigned time slot for said station, comparator means at said station to compare the station synchronization signal generated thereat, after said station synchronization signal has traversed the path from the station through the satellite and back to the said station, with the master synchronization signal to obtain a control signal, means for applying said control signal to said generator means to vary the timing of the synchronization signal produced thereby so that said synchronization signal occurs at a selected position within said time slot, and transmitter means controlled by said station synchronization signal for transmitting information in said assigned time slot.

20. For use in a satellite communication system of the time division multiplex type in which each station is assigned a time slot within a major frame, said major frame comprising a plurality of time slots, each time slot providing a guard interval and at transmission burst, each burst including a synchronization signal and message information wherein said synchronization signal occurs in a predetermined location within said time slot, a radio station including:

means receiving synchronizing signals from another station as a master synchronization signal as relayed from a satellite repeater, means for delaying the master synchronization signal at said station a predetermined amount depending upon the time slot it is desired to synchronize on and at a selected position within said time slot, means to generate a station synchronization signal adjusted in time with respect to the received master signal synchronization signal for controlling access to a desired time slot for said station in said communication system, comparator means at said station to compare the station synchronization signal generated thereat, after said station synchronization signal has traversed the path from the station to the satellite and back to the said station, with the master synchronization signal to obtain a control signal proportional to a time difference between the master synchronization signal and the station, and means responsive to said control signal for transmitting information from said station in the desired time slot.

References Cited

UNITED STATES PATENTS

| | | | |
|---|---|---|---|
| 2,509,237 | 5/1950 | Labin et al. | 325—54 X |
| 2,719,877 | 10/1955 | Treadwell et al. | 325—58 X |
| 2,869,121 | 1/1959 | Minnemen et al. | 343—103 |
| 2,980,907 | 4/1961 | Langeraar | 343—227 X |
| 3,021,508 | 2/1962 | White | 178—69.5 X |
| 3,128,465 | 4/1964 | Brilliant | 343—179 X |
| 3,195,047 | 7/1965 | Ruthroff | 325—46 |
| 3,051,948 | 8/1962 | Faymoreau et al. | 343—103 |
| 3,222,672 | 12/1965 | Forestier | 343—7 X |
| 3,320,611 | 5/1967 | Sekimoto et al. | 343—6.5 |

ROBERT L. GRIFFIN, *Primary Examiner.*

B. V. SAFOUREK, *Assistant Examiner.*

U.S. Cl. X.R.

325—4, 39, 58; 343—7, 179; 178—69.5